Aug. 20, 1940.                J. K. RUSSELL                    2,212,048
                                 SPOTLIGHT
                            Filed July 28, 1937            2 Sheets-Sheet 1
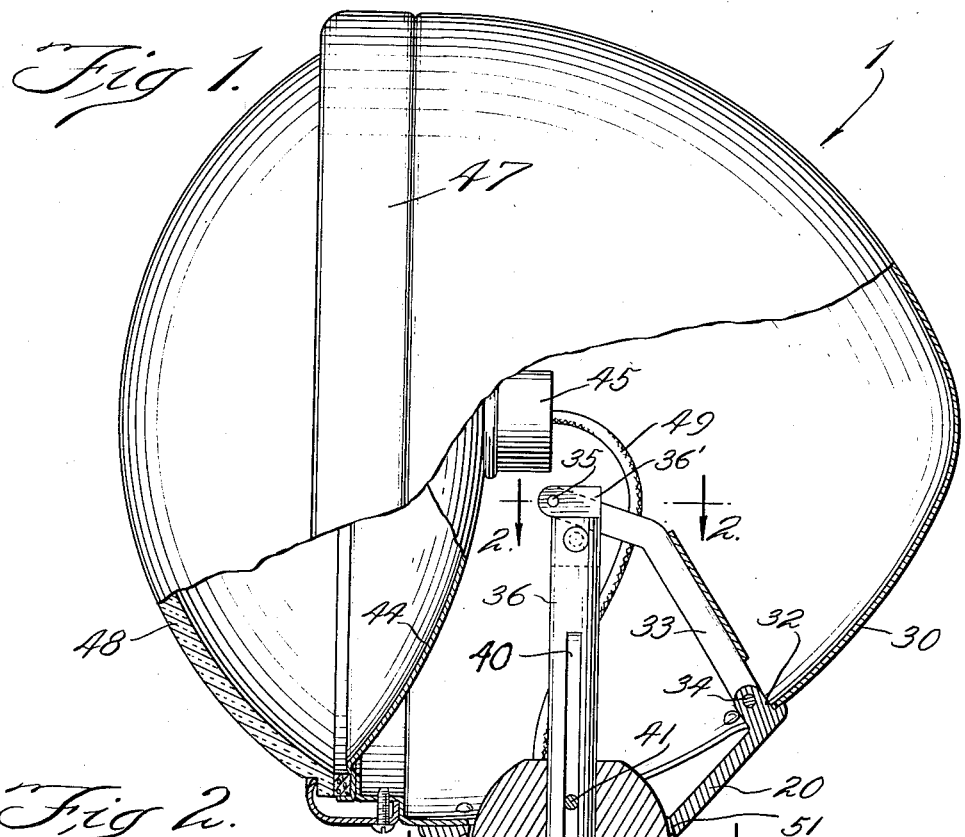
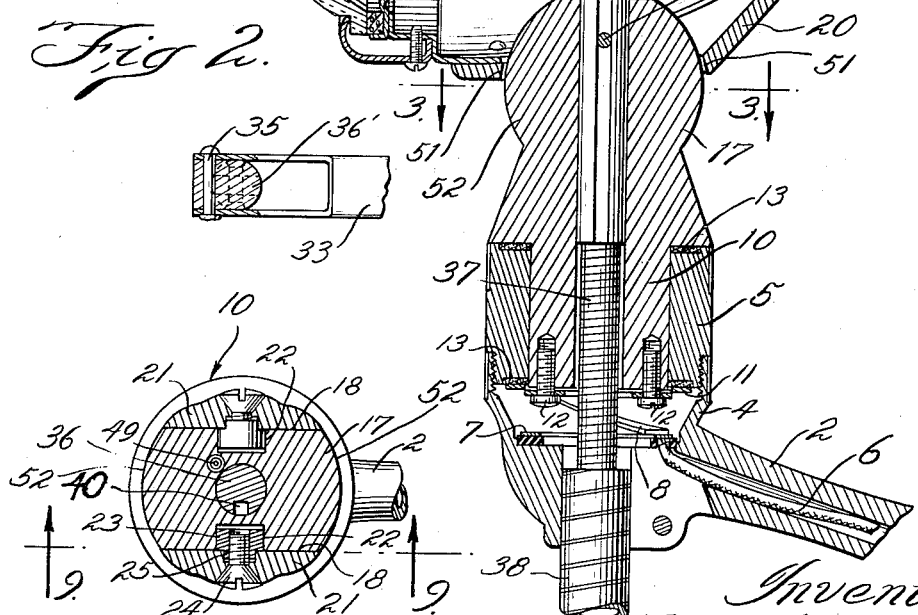
Inventor:
John K. Russell
By Morris Spector
Atty.

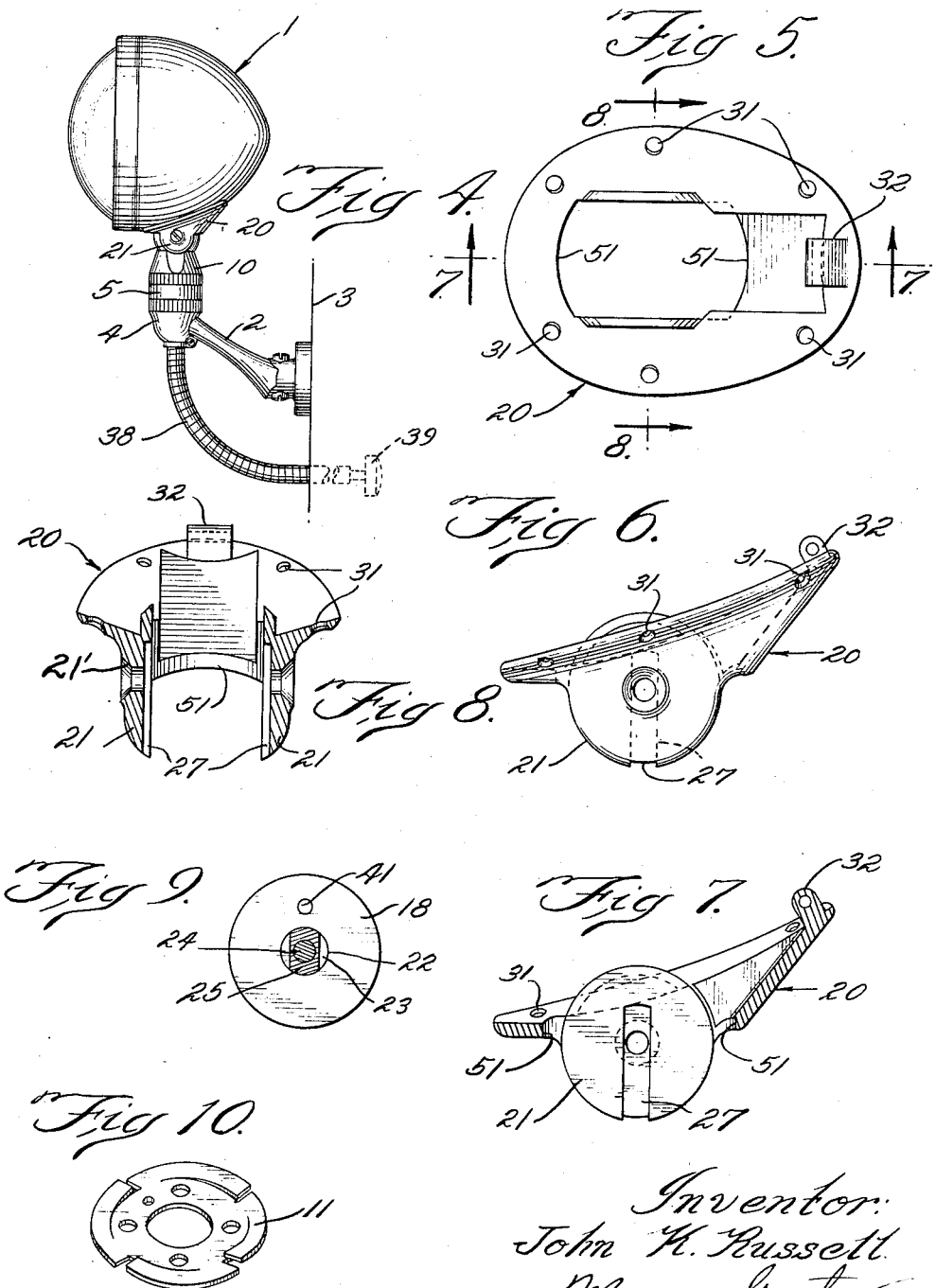

Patented Aug. 20, 1940

2,212,048

UNITED STATES PATENT OFFICE 2,212,048

SPOTLIGHT

John K. Russell, Los Angeles, Calif., assignor to Samuel M. Dover, Chicago, Ill.

Application July 28, 1937, Serial No. 156,186

11 Claims. (Cl. 240—61.13)

This invention relates to lamps of the type that are mounted for universal angular adjustment from a remote point. In its more particular aspects, the present invention relates to universal adjustable spot lamps such as are used on automobiles, and the mechanical means for controlling the angular movement of the lamp in two directions.

Heretofore automobile spotlights have been provided with means for effecting universal angular adjustment thereof from the interior of the automobile by means of a flexible shaft or the like which can be rotated to turn the spotlight about one axis and which can be reciprocated to turn the spotlight about another axis at right angles thereto. Such prior arrangements of the type with which I am familiar have been subjected to either or both of two objections, namely, either the operating mechanism was complicated and therefore expensive or likely to get out of order, or the structure was exposed to weather, which would necessarily interfere with continuous, reliable operation. It is one of the objects of the present invention to provide an operating mechanism for spotlights of the above character which will be fully enclosed, whereby the operation of the lamp is not interfered with by dirt, dust, sleet or the like, to which the lamp might be exposed. Also, a spotlight that is fully enclosed is easily maintained in a clean and pleasing appearance. It is a further object of the present invention to provide a fully enclosed operating mechanism for spotlights, which mechanism shall be simple and economical of construction and reliable in its action. It is a still further object of the present invention to provide a simple and reliable means for pivotally supporting the spotlight in such a manner that the tilting of the light to and fro can produce no forces which tend to loosen the pivotal connection.

The attainment of the above and further objects of the present invention will be apparent from the following specification taken in connection with the accompanying drawings forming a part thereof.

In the drawings:

Fig. 1 is a partial longitudinal sectional view of a lamp constructed in accordance with the teachings of the present invention;

Fig. 2 is a fragmentary sectional view taken along the line 2—2 of Fig. 1;

Fig. 3 is a sectional view taken along the line 3—3 of Fig. 1;

Fig. 4 is a side view of the lamp;

Fig. 5 is a plan view of the cradle used for supporting the lamp body;

Fig. 6 is a side view of the cradle of Fig. 5;

Fig. 7 is a sectional view taken along the line 7—7 of Fig. 5;

Fig. 8 is a sectional view taken along the line 8—8 of Fig. 5;

Fig. 9 is a fragmentary sectional view taken along the line 9—9 of Fig. 3, and

Fig. 10 is a perspective view of one of the springs.

Reference may now be had more particularly to the drawings. The spotlight comprises a lamp 1 supported by a supporting arm 2 which is adjustably mounted on any suitable member or fixed part of the automobile 3 (Fig. 4). The support 2 comprises an arm terminating at its forward end in a collar 4 that is internally threaded to receive a sleeve 5. The live conductor for carrying current to the lamp is indicated at 6 and extends through the supporting arm 2, said conductor terminating in a stationary slip ring 7 within the collar 4, which ring is engaged by a movable brush 8 carried by the rotary structure. A turret 10 extends through the sleeve 5 and rests on the top thereof and is secured to the sleeve by means of a spring ring 11 that is secured to the turret by means of a set of screws 12. A felt or other compressible friction washer 13 is interposed between the ring 11 and the sleeve 5 and between the turret and the top of the sleeve 5. The turret 10 is rotatable with respect to the sleeve 5 but is held against longitudinal movement with respect thereto by the spring ring 11. By tightening the screws 12 the spring ring 11 and turret 10 are pressed more firmly against the washers 13. The screws are adjusted until the pressure of the spring ring is sufficient to prevent even slight turning or chattering of the turret in the sleeve by the vibration to which the structure is subjected.

The turret has a rounded head 17 two sides of which are flat, as indicated at 18—18, to which a lamp supporting cradle 20 is pivoted by means of a pair of trunnions 23 to be more fully described as this specification proceeds. The cradle 20 has a pair of arms 21—21 that embrace the flat sides 18 of the turret head. Each of the sides 18 has a circular bore 22 therein for receiving a trunnion 23. Each trunnion comprises a short cylindrical stud which is bored and threaded to receive a screw 24 that extends through a hole 21' in the arm 21. Each trunnion is cut away or slabbed off to provide a non-circular front portion 25. The trunnions are placed in the respective bores 22 of the head 17, with their respective non-circular projections 25 extending outwardly of the corresponding faces 18 of the head. The inner surface of each arm 21 of the cradle has a slot 27 into which the projection 25 of the corresponding trunnion fits snugly so that the cradle may be shifted longitudinally with respect to the trunnion to bring the cradle into proper position, but once the cradle notches 27 embrace the projections 25 there can be no relative rotation of the cradle with respect to the trunnions. The screws 24 secure the cradle and the trunnions together.

The cradle 20 is adapted to receive and support a casing 30 of the lamp, the casing being secured to the cradle in any desired manner, as by rivets extending through rivet holes 31 in the cradle. The cradle 20 has an upwardly projecting lug 32 formed as an integral part thereof, which lug is embraced by two arms of a link 33 that are pinned to the lug by a pin 34. The opposite end of the link 33 is pivotally connected to an operating rod 36 by means of a pin 35 located off center with respect to the center line of the operating rod 36. For this purpose the rod 36 is slotted at its upper end and a lug 36' is fitted into the slot and riveted or otherwise secured in place. The rod 36 extends longitudinally through the turret 17 and is freely slidable with respect thereto. At its lower end operating rod 36 is connected to the movable element 37 of a flexible shaft to be reciprocated and rotated therewith. The outer or stationary casing of the flexible shaft is indicated at 38. The flexible shaft extends to a position convenient of access to the driver of the automobile, where the movable element 37 projects through the casing 38, in the usual manner, and has a handle or knob 39 secured thereto. The handle may be rotated to rotate the movable element of the flexible shaft or may be reciprocated to move the element 37 longitudinally within the casing and thus reciprocate the operating rod 36.

The lamp casing 1 has a reflector 44 secured thereto, which reflector carries a lamp socket 45 that receives an electric bulb, and the lamp casing also is provided with a lens holding rim 47 that holds a lens 48 in position. The circuit for the lamp bulb is carried by a conductor 49 that extends through the turret 17, the opposite terminal of the lamp being grounded in any desired manner. If desired, it is understood that the conductor 49 and the conductor 6 may each comprise two wires, of which both, or only one, may be insulated, as desired.

The body of the lamp is assembled on the turret by turning the trunnions 22 about their axes until the projecting portions 25 are parallel with one another and at such an angle that they will fit into the slots 27 of the arms 21 as the arms are slid downwardly over the turret head. Once the slots engage the projections 25 the lowering of the cradle is continued until the holes 21' in the arms 21, for receiving the screws 24, are opposite the trunnions, whereupon the screws are passed through the arms and threaded into the trunnions. As the screws 24 are drawn tight, the trunnions are drawn tightly against the arms 21 of the cradle. The cradle is thus pivotally fixed on the turret and can swing on its trunnions. The trunnions turn with the cradle but it is to be noted that the force for turning the trunnions is not transmitted thereto through the screws, because of the engagement of the projections 25 with the slots 27. As a result, the turning of the cradle with respect to the turret produces no forces which tend to loosen the screws 24 in the trunnions 23.

The operating rod 36 is moved until the holes in the link 33 can be brought into position for inserting the pin 35 in position. Thereafter reciprocation of the operating rod 36 in either direction causes the link 33 to rock the cradle about the trunnions, that is, about a horizontal axis. If the operating rod 36 is turned axially it imparts rotary motion to the lamp casing 1 about a vertical axis which is the axis of the rod 36. A keyway 40 may be formed in the rod 36 for receiving a pin 41 driven through the turret head 17, which pin and keyway permit free longitudinal movement of the rod 36 in the turret but lock the two against relative rotation. Upon turning of the rod 36 the turret and the lamp structure are turned directly by the force transmitted through the keyway and the pin 41. If desired, the keyway 40 and the pin 41 may be omitted, in which event the turning force is transmitted entirely through the pin 35 and link 33.

In the event the pin 35 becomes loose from wear, or other cause, repair may be made quickly and inexpensively merely by removing the screws 24, lowering the rod 36 and raising the casing until the pin 35 is below the cradle, thus facilitating replacing the pin 35.

The cradle is dished to conform to the outer surface of the lamp casing. The inner edges 51 of the cradle between the ears 21 are shaped to substantially slidably bear or wipe the opposed curved surfaces 52 of the turret head 17, thereby preventing access of dust, rain, sleet and other deleterious matter to the interior of the lamp casing.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A spotlight construction comprising a lamp casing having an opening, a cradle connected to said casing to constitute an assembly therewith, a support to which said cradle is pivoted about an axis, an actuating member longitudinally movable in said support at right angles to the pivot axis and projecting through said opening into said casing, and a link entirely within the casing and pivoted to the projecting part of said member and to said casing and cradle assembly to transmit reciprocating movement of said member into swinging movement of said casing about said axis, said support and cradle being closely interfitted and arranged to close said casing against entry of deleterious matter through said opening, said actuating member with the link connected thereto being retractable through said opening while the link remains also connected to the casing and cradle assembly.

2. A spotlight construction comprising a lamp casing assembly having an opening, a support extending into the opening and making a wiping fit with the assembly for excluding the entrance of dirt into the assembly through said opening, casing mounting means extending outwardly of the casing assembly adjacent the opening and constituting a part of the casing assembly, a pivot connection between said support and said outwardly extending mounting means whereby the casing pivots about an axis outside of said casing, an actuating member longitudinally movable in said support at right angles to said axis and projecting through said opening into said casing, and a link pivoted to said projecting part and to said casing to convert longitudinal movement of said member into swinging movement of said casing about said axis.

3. A spotlight construction comprising a lamp casing assembly having an opening, a support to which said casing is pivoted about an axis outside of said casing, said support extending into said opening and having curved surfaces opposite certain edges of the opening, means closing the opening between the casing and the curved surfaces and slidably bearing along the curved surfaces as the casing pivots about said axis, an actuating member reciprocal in said support at right angles to said axis and projecting through said opening into said casing, a link pivoted to said projecting part and pivoted to said casing to convert reciprocal movement of said member into swinging movement of said casing about said axis, said link being pivoted to the lamp casing assembly at a distance from the opening less than the length of the link and being rotated about its last mentioned pivot axis into a position to bring the connection between the link and the actuating member through said opening, and means including said member for turning said casing about an axis transverse to the first-mentioned axis.

4. A spotlight construction comprising a support, a lamp casing assembly having an opening, casing mounting means extending outwardly of the casing adjacent the opening, a pivotal connection between said support and said outwardly extending mounting means, whereby said casing pivots about an axis outside of said casing, an actuating member reciprocable in said support in a direction substantially at right angles to the pivot axis and projecting into said casing, and a connection within said casing linking the projecting part of said member to said casing assembly, said connection including a link and a pivot pin between the link and the actuating member, said pivot pin being arranged to be projected out of said casing upon release of the pivotal connection between said support and casing.

5. A spotlight construction comprising a support, a turret rotatably mounted on said support, a lamp casing having an opening, a cradle connected to said casing to constitute an assembly therewith, said cradle being pivotally connected to said turret about a pivot axis at substantially right angles to the first mentioned axis of rotation and having a wiping fit with said turret as it pivots with respect to the turret to prevent access of deleterious matter to the interior of said casing through said opening, a rotatable actuating member in and reciprocal relative to said turret and locked to the turret for rotating the turret and projecting thereabove through said opening into said casing, said actuating member having a snug fit within the turret whereby it will reciprocate without tilting with respect to the turret, a link pivotally connected at one end to the projecting part of said actuating member and at its other end to said casing assembly so that said casing will tilt about its pivot axis in response to reciprocating movement of said member, and means for rotating the actuating member to rotate the casing and for reciprocating the member to tilt the casing.

6. A spotlight comprising a support, a turret member removably and rotatably mounted on said support, means enclosed by said support and accessible upon removal of said turret member and providing an antirattle friction connection between said turret member and said support to hold said turret member in the desired position of adjustment, a lamp casing, a cradle member connected to said casing and releasably and tiltably connected to and having a close sliding fit with said turret member to prevent access of dirt into said casing, said connection between said members comprising stud means having trunnioned engagement with one of said members, screw means securing the studs to the other member, means independent of the screw means for locking the stud means against rotation with respect to said other member, so that the tilting of said casing about the trunnions will not affect the adjustment of said screw means, and means for tilting said casing, said tilting means comprising an actuating rod having reciprocating movement in said turret member and projecting into said casing, a link pivoted to the projecting part of said rod within the casing and pivoted to said cradle member so that upon reciprocation of said rod said casing is tilted about the trunnioned axis.

7. A lamp mounted for rotative movement about two axes at right angles to one another comprising a lamp body having an opening and outwardly extending mounting means adjacent the opening, a support, a pivotal connection between the support and mounting means whereby the lamp body is mounted for pivotal movement about a first axis outside of the lamp body, said support being mounted for rotation about an axis intersecting said first axis at 90°, a rod extending through the support parallel with the axis of rotation of the support and intersecting said first axis, said rod being axially rotatable and longitudinally movable, a connection between said rod and said body for preventing rotation of the body with respect to the rod about the axis of rotation of the rod whereby the body rotates with the rod about the axis of the rod upon axial rotation of the rod, said connection including means for swinging the lamp body about the first axis upon longitudinal movement of the rod, and means for selectively rotating and longitudinally reciprocating said rod, for turning the lamp about its two axes selectively.

8. A lamp mounted for rotative movement about two axes at right angles to one another comprising a lamp body, a support on which the lamp body is mounted for pivotal movement about a first axis, said support being mounted for rotation about an axis intersecting said first axis at 90°, a rod extending through the support parallel with the axis of rotation of the support and extending into said lamp body through an opening therein, said rod being axially rotatable and longitudinally movable, means within the lamp body between said rod and said body for swinging the lamp body about the first axis upon longitudinal movement of the rod, said means including a link pivotally connected to the rod, said link being also pivotally connected to the body and at a distance from the opening less than the length of the link between the two pivotal connections and said link being rotatable about the axis pivoting it to the body into a position bringing the pivotal connection between the link and the rod through said opening to a position accessible from outside the body, and means for selectively rotating and longitudinally reciprocating said rod, for turning the lamp about its two axes selectively.

9. A lamp mounted for rotative movement about two axes at right angles to one another comprising a lamp body having an opening, a support on which the lamp body is mounted for pivotal movement about a first axis, said support substantially closing said opening and having curved surfaces slidably engaged by said body to maintain said opening closed as the body pivots about said first axis, said support being mounted for rotation about an axis intersecting said first axis at 90°, a rod extending through the support parallel with the axis of rotation of the support and intersecting said first axis and extending into said lamp body, said rod being axially rotatable and longitudinally movable, a link within the lamp body and pivotally connecting said rod and said body, said link being interlocked with said rod to prevent relative rotation of the two about the axis of the rod while permitting relative rotation of the two about another axis, whereby the body rotates with the rod about the axis of the rod upon axial rotation of the rod, said link swinging the lamp body about the first axis upon longitudinal movement of the rod, said link being pivoted to the body at a distance from the opening less than the length of the link and being rotatable about the axis pivoting it to the body into a position bringing the pivotal connection between the link and the rod through said opening, and operating means for selectively rotating and longitudinally reciprocating said rod for selectively turning the lamp about its two axes selectively.

10. A light comprising a support, a member removably and rotatably mounted on said support, a lamp casing, a cradle member connected to said casing and releasably and tiltably connected to and having a close sliding fit with said first member to prevent access of dirt into said casing, said connection between said members comprising stud means having trunnioned engagement with one of said members, screw means securing the studs to the other member, means independent of the screw means for locking the stud means against rotation with respect to said other member, so that the tilting of said casing about the trunnions will not affect the adjustment of said screw means, and means for tilting said casing.

11. A light comprising a support, a member removably and rotatably mounted on said support, a lamp casing, a cradle member connected to said casing and releasably and tiltably connected to and having a close sliding fit with said first member to prevent access of dirt into said casing, said connection between said members comprising stud means having trunnioned engagement with one of said members, screw means securing the studs to the other member, means independent of the screw means for locking the stud means against rotation with respect to said other member, so that the tilting of said casing about the trunnions will not affect the adjustment of said screw means, and means for tilting said casing, said tilting means comprising an actuating rod having reciprocating movement in said first member and projecting into said casing, a link pivoted to the projecting part of said rod within the casing and pivoted to said cradle member so that upon reciprocation of said rod said casing is tilted about the trunnioned axis.

JOHN K. RUSSELL.